No. 748,191. PATENTED DEC. 29, 1903.
A. JOHNSTON.
SELF LUBRICATING METALLIC BALL AND PROCESS OF MAKING SAME.
APPLICATION FILED JUNE 2, 1903.
NO MODEL.

No. 748,191.                                                   Patented December 29, 1903.

UNITED STATES PATENT OFFICE.

ALLEN JOHNSTON, OF OTTUMWA, IOWA.

SELF-LUBRICATING METALLIC BALL AND PROCESS OF MAKING SAME.

SPECIFICATION forming part of Letters Patent No. 748,191, dated December 29, 1903.

Application filed June 2, 1903. Serial No. 159,820. (No model.)

*To all whom it may concern:*

Be it known that I, ALLEN JOHNSTON, a resident of Ottumwa, Iowa, have invented a new and useful Improvement in Self-Lubricating Metallic Balls and Processes of Making Same, which invention is fully set forth in the following specification.

My present invention comprises a hollow metallic bearing-ball containing lubricant which is adapted to ooze or leak out through one or more cracks, crevices, seams, or other small perforations in the wall of the ball, thereby lubricating the latter in its bearings.

The invention further comprises the combination, with a raceway, of a gang of hollow balls, one or more or all of which are self-lubricating balls of the character described. It further comprises an improved process of charging hollow metallic balls with lubricant.

Figure 1:
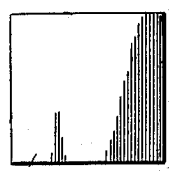
Figures 2, 3, 4:
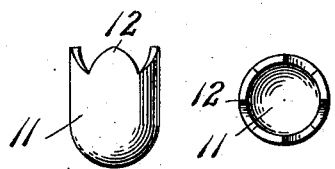
Figure 5:
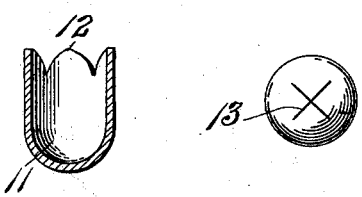
Figure 6:
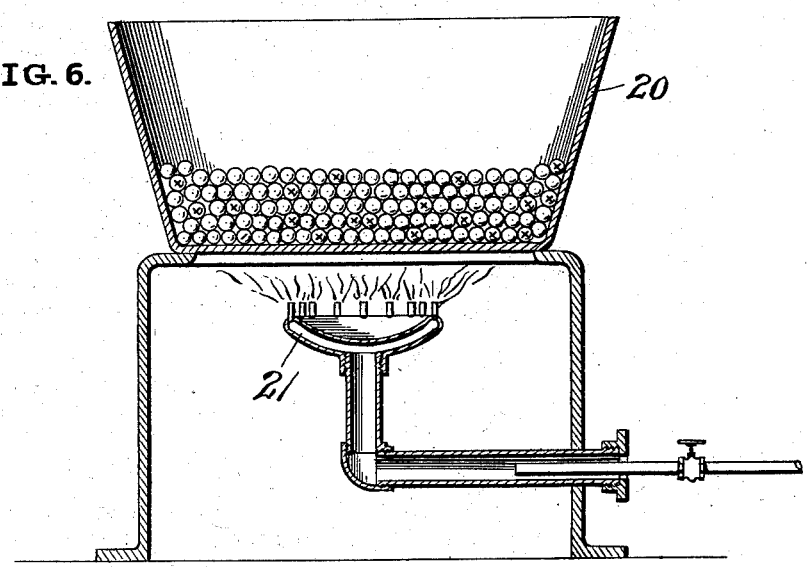
Figure 7:
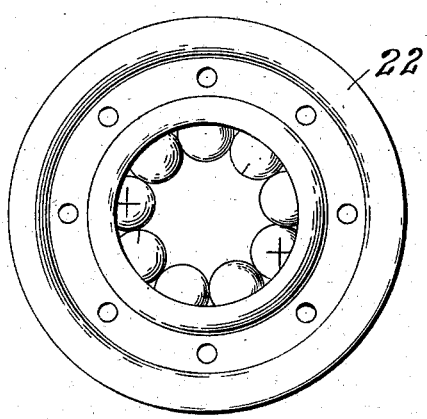
Figure 8:
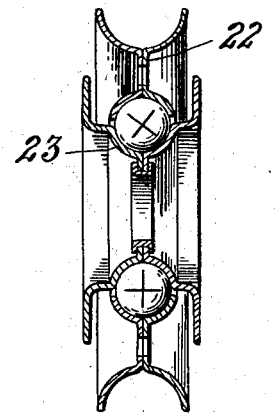

In the accompanying drawings, which will serve to illustrate my invention, Figures 1 to 5 are a series of views showing the different steps of making a hollow ball from a square sheet-metal blank, Fig. 1 being a plan of the blank, Fig. 2 an elevation showing the blank struck up to cup form, Fig. 3 a plan of Fig. 2, Fig. 4 a vertical section of Fig. 3, and Fig. 5 a plan of a completed ball. Fig. 6 is a sectional view showing a vessel containing balls and lubricant and a burner for heating the same. Figs. 7 and 8 are plan and sectional views, respectively, showing a raceway with a gang of balls therein any number of which may be self-lubricating balls, such as herein described.

My invention is not limited to balls made in any particular way so long as they are adapted to receive and contain lubricant and are provided through the wall thereof with proper outlet for the same. Likewise it is not limited to any particular way of introducing the lubricant into the ball, although preference is given to one or another of the methods herein described, according to the quantity of lubricant which it is desired to place within the ball, the character of the lubricant, and other circumstances. Fig. 5 shows by way of example a hollow metallic ball suitable for containing lubricant to constitute a self-lubricating ball within this invention. It is made from a square metal blank 10, Fig. 1, which is first bent to the shape of a cup 11, Fig. 2, by the use of suitable dies. This cup is next reduced to spherical shape, Fig. 5, by the use of suitable dies, which act to bring the points or apices 12 together, the edges thereof forming seams 13, Fig. 5. Although these seams are closed in the sense that the edges forming the same fit closely together, they are not, at least at certain points, air or liquid tight, so that lubricant contained within the ball will slowly ooze or leak out through one or more cracks, slightly-open seams or perforations thus formed through the wall of the ball thereby serving, according to the quantity of contained lubricant and size of the outlet, to lubricate the ball for an extended period.

The lubricant may be introduced into the balls in a variety of ways. According to one method the blank 10, Fig. 1, or strip of metal, preferably steel, from which the ball is formed is first coated with a lubricant, preferably cosmoline or grease, which not only prevents injury to the dies, but in the bending of the metal is inclosed within the ball. Furthermore, in finishing the balls by rolling (as described in my Patents Nos. 709,409 and 720,436) and other operations lubricant liberally applied to the balls will not only facilitate the operation, but will find its way into the interior of the ball through the cracks, seams, or perforations, such as hereinbefore referred to. Oil or grease thus introduced into the hollow balls will constitute a supply of lubricant for ball-bearings for a considerable time. When a greater supply is needed, the balls may be placed with the lubricant in a receptacle, such as 20, Fig. 6, and heated by a gas-air burner 21, for example. The heating of the balls expands the same, opening the seams to a certain extent, and rarefies the air within the balls. In cooling a partial vacuum will be formed, causing more air and a quantity of lubricant to be drawn in, the quantity of lubricant depending upon whether the balls are fully or only partially submerged.

Another method of introducing the lubricant is to place a number of balls within an air-tight receptacle filled with lubricant pumped in under pressure, thereby forcing lubricant into the balls and compressing the air therein. When the pressure is removed, the air will escape more readily than the lubricant, leaving the latter or the larger portion thereof in the ball.

As to the advantages of the hollow self-lubricating balls of this invention the lubricant being confined to some extent from the action of the exterior atmosphere will not evaporate as rapidly as lubricant applied only to the exterior surface, and in practice it is found that in operating in a raceway enough lubricant will be discharged from the balls to keep the bearings lubricated for a much longer period than when the lubricant is applied in the ordinary manner. Furthermore, the resiliency of hollow metallic balls made in the manner hereinbefore indicated and the variations in pressure upon the ball as it changes its position in the raceway will effect a slight opening and closing of the seams, acting to work the lubricant outward into the seams and thence onto the exterior surface of the ball. Centrifugal force developed by rotation of the balls in the raceway assists in causing the lubricant to find its way out through the seams, crevices, or perforations in the wall of the ball.

In Figs. 7 and 8 I have shown a gang of balls any suitable number or all of which may be self-lubricating balls, operating in a raceway formed by a pulley 22 and cone-bearing surfaces 23.

I claim as new—

1. A self-lubricating element consisting of a hollow metallic ball containing lubricant.

2. A self-lubricating element consisting of a hollow metallic ball containing lubricant and having an outlet in its wall through which said lubricant may pass to the exterior thereof.

3. A self-lubricating element consisting of a hollow resilient metallic ball containing lubricant and having an outlet in its wall through which said lubricant may pass to the exterior thereof.

4. In a ball-bearing, the combination with a raceway, of a gang of balls one or more of which are hollow and metallic, contain lubricant and have an outlet in the walls thereof through which said lubricant may pass to the exterior of the ball.

5. In a ball-bearing, the combination with a raceway of a gang of hollow metallic balls containing lubricant and having an outlet in the wall thereof through which said lubricant may pass to the exterior of the ball.

6. In a ball-bearing, the combination with a raceway of a gang of balls one or more of which are hollow resilient and metallic, contain lubricant and have an outlet in the wall thereof through which said lubricant may pass to the exterior of the ball.

7. The herein-described process of making hollow self-lubricating balls which consists in forming said balls from sheet metal and leaving a passage therein through which lubricant may enter and then heating said balls in the presence of a lubricant, whereby the heated lubricant is enabled to enter the ball through the passage aforesaid.

8. The herein-described process of making hollow metallic balls self-lubricating consisting in introducing a heated lubricant therein through a passage in the wall thereof by which said lubricant may also leave the ball.

In testimony whereof I have signed this specification in the presence of two subscribing witnesses.

ALLEN JOHNSTON.

Witnesses:
R. W. FUNK,
J. B. MOWREY.